United States Patent [19]

Hallbach

[11] Patent Number: 5,246,414
[45] Date of Patent: Sep. 21, 1993

[54] COVER FOR TOOL MEMBER ROTATION DEVICE

[75] Inventor: Raymond L. Hallbach, Simpsonville, S.C.

[73] Assignee: Cincinnati Milacron Inc., Cincinnati, Ohio

[21] Appl. No.: 903,401

[22] Filed: Jun. 24, 1992

[51] Int. Cl.⁵ ............................. B23B 3/26; B23Q 3/157
[52] U.S. Cl. .................................... 483/3; 82/131; 409/134
[58] Field of Search ............... 483/1, 31; 409/134; 408/241 G; 82/123, 131

[56] References Cited

U.S. PATENT DOCUMENTS

| | | | |
|---|---|---|---|
| 3,512,817 | 5/1970 | Attermeyer | 287/103 |
| 3,930,302 | 1/1976 | Ochiai et al. | 483/3 |
| 4,354,305 | 10/1982 | Plummer et al. | 82/131 X |
| 4,404,728 | 9/1983 | Ishikawa | 29/568 |
| 4,489,629 | 12/1984 | D'Andrea et al. | 82/1.2 |
| 4,607,549 | 8/1986 | Krempel | 82/2 |
| 4,612,831 | 9/1986 | Lehmkuhl | 82/131 X |
| 4,930,953 | 6/1990 | Fischer | 409/134 |

OTHER PUBLICATIONS

Cincinnati Milacron Inc. brochure Publication No. M-5294, "MAXIM" 500 Horizontal CNC Machining Center.
Photocopy: Kennametal Company "UCenter" boring heads technical manual.
Photocopy: Micron Instrument Corp. programmable limit swich manual.

*Primary Examiner*—Z. R. Bilinsky
*Attorney, Agent, or Firm*—Thomas M. Farrell

[57] ABSTRACT

A servomotor-driven U-axis tool member rotation device for a boring and facing head is affixed to a machine by a bracket, and has a torque coupling slidable on the servomotor shaft. A cover is mounted to a pivot shaft on the bracket, and is rotated by the servomotor to selectively cover and uncover the torque coupling. The cover pivot shaft has a driven gear, and the torque coupling has a driving gear. When a U-axis head is disengaged from the torque coupling and machine spindle, the gears are held in mesh by a biasing spring applied to the torque coupling, and the cover may be rotated. When a U-axis head engages the torque coupling, the biasing spring is overcome and the gears are forced out of mesh; at this time, the servomotor may rotate the input tool member of the U-axis head to position its tool, while the cover remains stationary in the open position.

16 Claims, 6 Drawing Sheets

COVER FOR TOOL MEMBER ROTATION DEVICE

FIELD OF THE INVENTION

The invention relates generally to machine tools which have a power unit to which detachable tools are periodically connected. The invention relates particularly to those machine tools which employ a detachable tool, having a rotary coupling element, which is mated to a motorized tool member rotation device on the machine.

BACKGROUND OF THE INVENTION

Many machine tools, particularly modern machining centers, have a main spindle with a bore adapted to receive a variety of tools, each having a commonly configured tool shank. One frequently encountered tool is a complex head which has the commonly configured tool shank at one end, and which may be stored in a tool storage matrix on machines having automatic tool changing mechanisms. This complex head is often referred to as a boring and facing head, where the other end of the head supports a tool bar, for example, a single point turning or boring bar. The tool bar needs a variable swing, and is thus required to be adjustable in a direction transverse to the spindle and tool shank axis. This transverse direction is known as the "U-axis" of a machining center. The main body of the head includes a slideway, transverse to the central axis, and an interior mechanism for the transverse adjustment, where the interior mechanism might, for example, comprise a rotatable lead screw engaging a nut affixed to the transverse tool slide carrying the tool bar. The boring and facing head main body has a radially extending arm which includes a drive train, and which, at its outermost end, supports a drive shaft extending parallel to, and in the same direction as, the tool shank. The outer end of the drive shaft has a rotary coupling element which mates with a motorized tool member rotation device on the machine tool. The tool member rotation device is driven by a servomotor which may precisely rotate the drive shaft and, consequently, accurately position the tool bar along the U-axis. This precise movement may occur while the main spindle of the machine and the tool shank are either rotating or stationary.

Two patents are instructive as to how prior art boring and facing heads may be constructed; they are, U.S. Pat. Nos. 4,489,629 of D'Andrea et al, Dec. 25, 1984, and 4,607,549, of Krempel, Aug. 26, 1986. Each of these patents shows a wedge-shaped blade or tang as part of an input drive shaft, where the tang is to be received in a complementary mating socket on the machine tool, when the tool shank of the head is received with the machine spindle and retained by well-known drawbar retention means. The configuration of the torque couple for transmitting rotary motion to the drive shaft is relatively unimportant. Many variations are possible, e.g., an inversion where the drive tang is located on the machine tool servo motor and the input drive shaft of the boring and facing head has a complementary mating socket.

The head patents do not address a method or an apparatus for keeping the tool connecting portion of the tool member rotation device free of chips, coolant, and other contaminants which may find their way into the exposed mechanism when the boring and facing head is not present on the machine.

It is known in machine tool arts to provide a blast of compressed air to a machine tool element to clear a tool shank socket of chips and contaminants; such a system is shown in U.S. Pat. No. 4,404,728, of Ishikawa, Sep. 20, 1983.

Another system for maintaining cleanliness in a tool receiving and registration mechanism is found in U.S. Pat. No. 3,512,817, of Attermeyer, May 19, 1970, in which a machine station and detachable workpiece pallet are each fitted with a precision multi-tooth facial coupling half, and each half is covered by a thick rubber membrane seal. The seal is deflected away from the facial teeth of a coupling half by a projecting rim on the mating half which leads the way as the coupling halves are joined with one another. When the joint is later broken, and the coupling halves are separated, the deflected rubber membrane seals will return to their normally biased positions covering the facial teeth.

Several drawbacks are presented by these prior art methods for sealing and maintaining cleanliness of tool registration surfaces: in the purging system, a blast of air or other fluid may be insufficient to exclude or remove large chips of metal, which frequently have burrs and tend to snag; and, the deformable membrane seal device requires custom molded elements, which are very expensive and tend to fatigue in use and thereby lose bias resiliency, or shape memory. The present invention overcomes these problems inherent in the prior art.

SUMMARY OF THE INVENTION

It is an object of the invention to provide a nondeformable mechanical means for shielding a machine drive unit from contaminants.

Another object of the invention is to provide a positive shield for the torque couple member of a machine drive unit which may be automatically applied to cover the member and exclude contaminants from it when a tool is absent from the machine, and, which may be actuated to uncover the torque couple member when a tool is present at the machine.

A further object of the invention is to provide a contaminant excluding cover for a tool member receiving socket of a machine drive unit which is relatively simple in construction and automatically applied.

Another object of the invention is to provide a cover for a tool member rotation device of a machine tool, wherein a tool member receiving socket is rotatably powered by a motor, and wherein the same motor is utilized to drive the cover to the covered and uncovered positions relative to the tool member receiving socket.

Still another object of the invention is to provide a cover means for a tool-receiving connection member of a machine tool where the connection member is motorized by a servomotor, and the servomotor is also employed to drive the cover between covered and uncovered positions relative to the tool-receiving connection member, wherein the cover and servomotor are drivingly engaged when a tool is absent from the tool-receiving connection member, and wherein the cover drive means is automatically disengaged from the servomotor when a tool is present and engages the tool-receiving connection member.

In accordance with the foregoing objects of the invention, the invention is shown embodied in an improved tool member rotation device for driving a detachable tool of a machine, comprising: a bracket, having a first portion, a second portion, and means for attaching the bracket to a machine; a motor means for driving the tool member, the motor means being affixed to the bracket, proximal the first portion, the motor means having a rotary shaft extending towards the second portion, along a shaft axis; connector means on the shaft axis for detachably connecting the rotary shaft to the tool member; cover means for selectively covering and uncovering the connector means, the cover means being movably mounted to the bracket; and, cover drive means for moving the cover means, the cover drive means being drivingly connected to the rotary shaft when the tool member is uncoupled from the connector means, and the cover drive means being disconnected from the rotary shaft when the tool member is coupled to the connector means.

In the preferred embodiment, the cover means has a substantially planar portion, having a tool clearance opening, the cover being pivotally-mounted on the bracket and rotatably driven by agency of a driving gear affixed to the connector element and a driven gear affixed to a cover pivot shaft, the gears being enmeshed by a biasing spring. The gears are disengaged when a tool member is received with the connector means and overcomes the biasing spring.

DESCRIPTION OF THE PREFERRED EMBODIMENT

At the outset, it should be noted that attitudinal references, such as "horizontal", "vertical", "rear", "front", and the like, are provided solely for the orientation and convenience of the reader, and do not represent limitations on the various environments in which the invention may be utilized.

Figure 1:
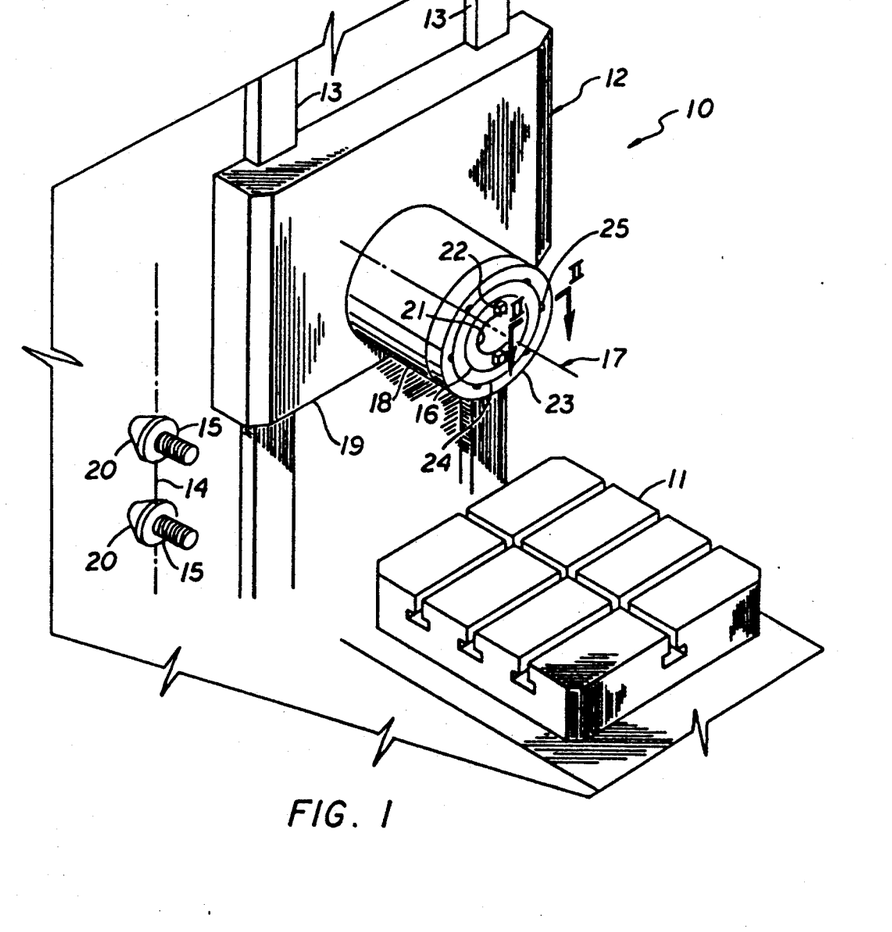
FIG. 1 is a perspective view of a horizontal machining center which might typically employ the invention.
Figure 2:
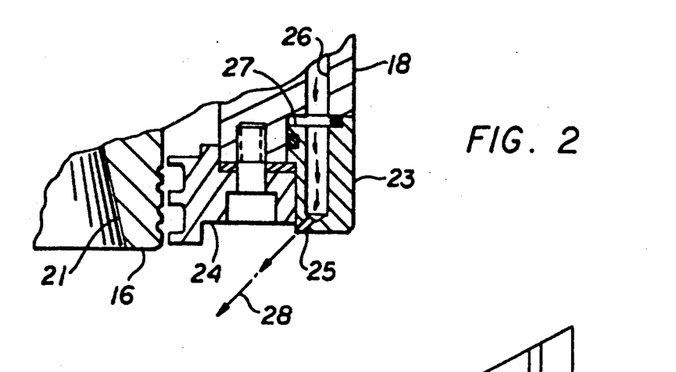
FIG. 2 is a sectional view through a coolant ring carried on the machining center, taken along the line II—II of FIG. 1.

FIG. 1 of the drawings exemplifies a typical machine 10 which might employ the present invention. The machine 10 depicted is a MAXIM CNC Horizontal Machining Center available from Cincinnati Milacron Inc., the assignee of the present invention. The machine 10 includes a work supporting pallet 11, and a spindle carrier 12 which is vertically movable on column ways 13 with respect to the work supporting pallet 11. The machine 10 also includes a tool storage chain 14. The chain 14 holds a plurality of tools 15 which may be randomly selected and interchanged with the machine spindle 16 by means of an overhead toolchanger (not shown). The machine spindle 16 is supported for rotation about a spindle axis 17 within a cylindrical spindle housing 18 which extends from the body 19 of the spindle carrier 12. All tools 15 utilized in the machine 10 have a commonly configured tapered tool shank 20, and the spindle 16 has a tapered socket 21 mated to the tool shanks 20. The spindle 16 is also provided with a pair of drive keys 22 which positively transfer torque from the spindle 16 to tool 15 in a well-known manner. The spindle housing 18 supports a coolant ring 23 which is stationarily held against the housing 18 by a labyrinth seal ring 24. With reference also to FIG. 2, the coolant ring 23 has a plurality of holes 25 angled in a conical pattern around its inside perimeter and, when coolant is received via interdrilling 26 through the spindle housing 18, connecting with an annular distributor groove 27 at the interior face of the coolant ring 23, coolant will be sprayed through plural streams 28 converging at the tool cutting zone.

Figure 3:
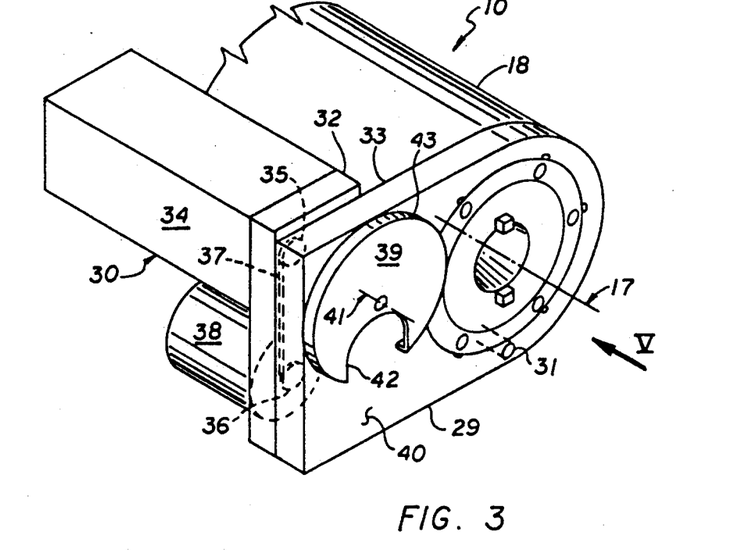
FIG. 3 is a perspective view of an auxiliary tool member rotation device applied to the machining center of FIG. 1, depicting a drive element cover in a closed position.

Referring now to FIG. 3, the coolant ring 23 of FIGS. 1 and 2 has been removed from the machine 10 and replaced by a thick, plate-like bracket 29. When viewed in the direction of arrow 5, the portion of the bracket to the right of the spindle axis 17 is shaped to the outline of the spindle housing 18, while the portion extending to the left is rectangular and carries an auxiliary servodriven tool member rotation device 30. The elongated bracket 29 has the same spray arrangement as the coolant ring 23, and is likewise retained against the spindle housing 18 by the labyrinth seal ring 24. Additionally, a pin 31 has been driven through the lower part of the bracket 29 in order to angularly fix the bracket 29 with respect to the spindle axis 17. It will be appreciated by those skilled in the art that the bracket 29 depicted may be substituted-for by a variety of brackets, which may include screws, angled foot plates, etc., for attachment to the spindle housing 18. The bracket mounting technique shown provides a convenient means for optional field-retrofitting of a standard machine 10 without machining the spindle housing 18. At the left end of the bracket 29, a motor mounting plate 32 is shown affixed to the first portion or rear face 33 of the bracket 29. The motor mounting plate 32 supports a rearwardly-extending servomotor 34 which may be precisely controlled by a computer numerical control unit (CNC) (not shown) in a well-known manner. The servomotor 34 has an integral resolver (not shown). The plate 32 also serves as a housing for a pair of pulleys 35,36 and their interconnecting drive belt 37, used for rotating the shaft of a rotary limit switch 38 which is mounted directly below the servomotor 34. The servomotor 34 is available from Siemens Energy & Automation, Inc., Industrial Motor Division, Norwood, Ohio; the rotary limit switch 38 is available from the Micron Instrument Corporation, Plainview, N.Y.

A cover 39, which is generally planar and circular, is mounted adjacent the second portion or front face 40 of the bracket 29, and is rotatable about a pivot axis 41 extending from the bracket 29. The cover 39 has a radial cut-out forming a tool clearance opening 42 extending from its outer skirt 43 to a point near the pivot axis 41.

Figure 4:
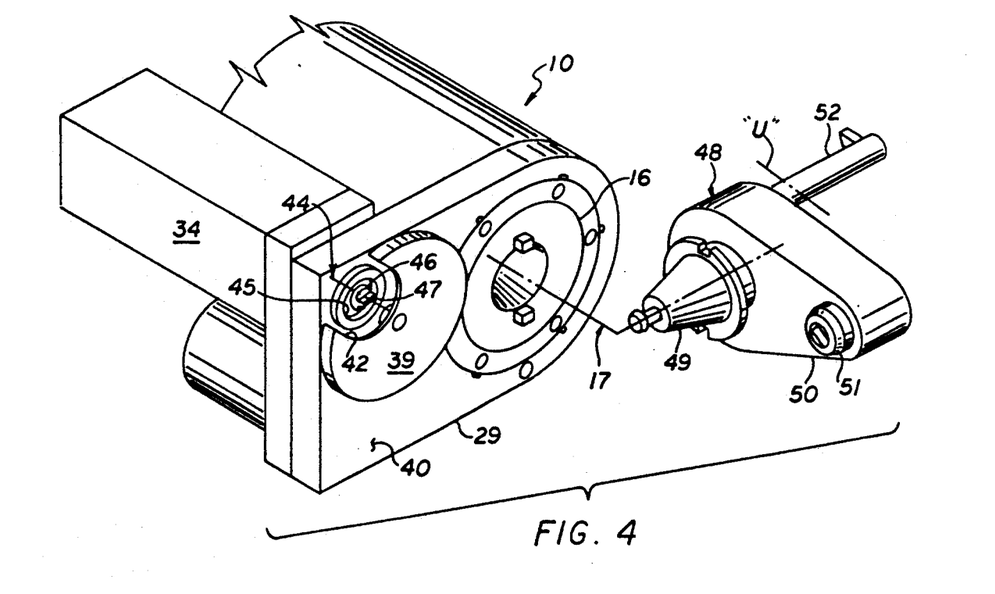
FIG. 4 depicts the elements of FIG. 3, with the cover moved to the open position.

With reference to FIG. 4, the cover 39 of FIG. 3 is shown rotated approximately 165° clockwise, to align the tool clearance opening 42 with the shaft axis 44 of the servomotor 34. Along the shaft axis 44, near the front face 40 of the bracket 29, is a tapered registration socket 45, and a coaxial connector means, or torque coupling element 46, having a wedge-shaped drive tang 47 extending across the axis 44. FIG. 4 also shows a boring and facing head 48, having a tapered tool shank 49 which is to be received into the spindle 16 of the machine 10. The head 48 has a radially-extending arm 50 which supports an input tool member 51, mated to register, or seat, in the tapered tool registration socket 45, and therein engage the drive tang 47 which is spring-biased to the outward position, i.e., towards the front face 40 of the bracket 29. The input tool member 51 positions a tool 52 along a U-axis, transverse to the spindle axis 17. This type of head 48 is commercially available from the Kennametal Inc., Metalworking Systems Division, Raleigh, N.C., as the UCENTER boring head series.

Figure 5:
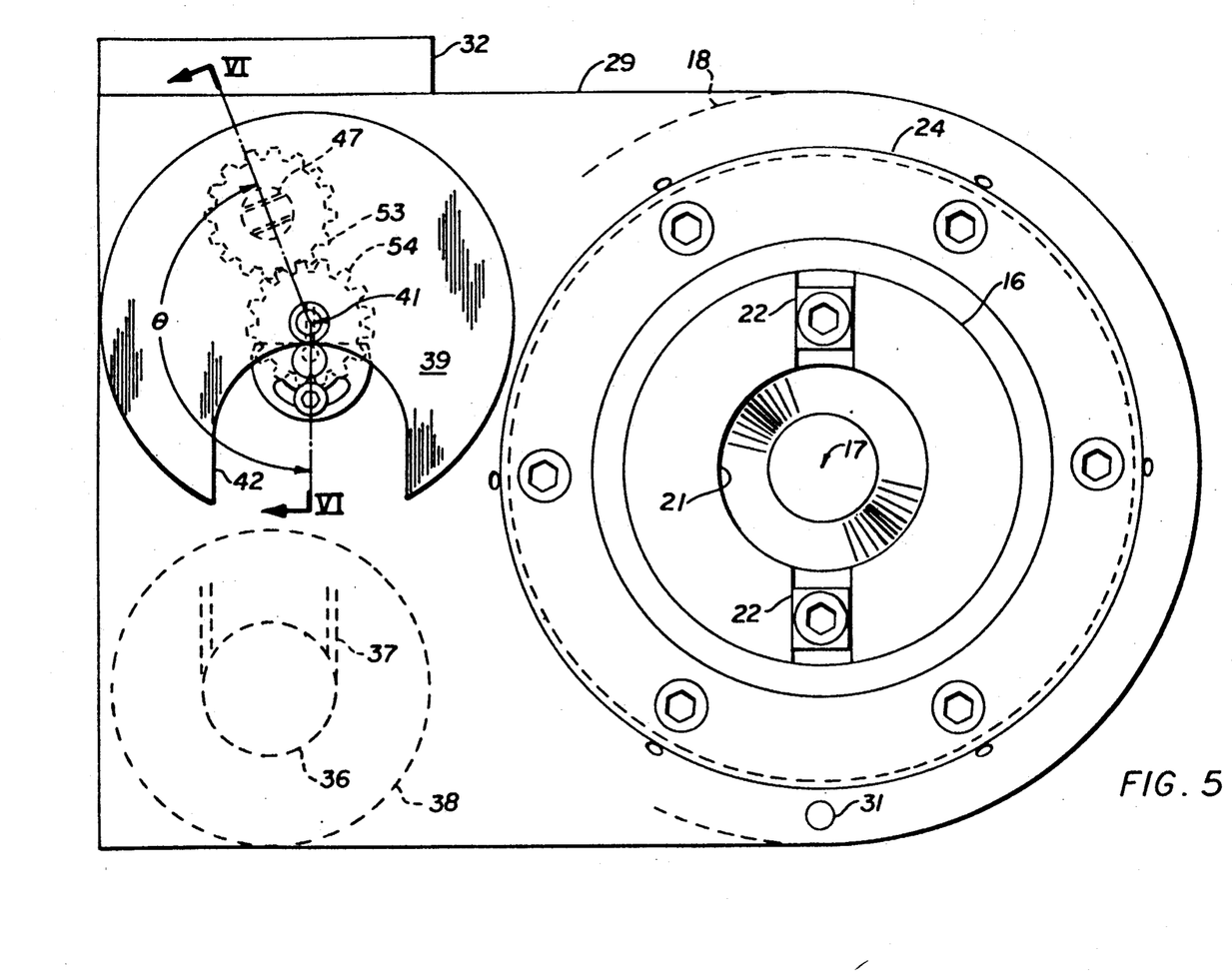
FIG. 5 is a front elevational view of the auxiliary tool member rotation device, taken in the direction of arrow V of FIG. 3.

Turning now to FIG. 5, this front elevational view shows the bracket 29 held against the spindle housing 18 by the labyrinth seal ring 24, and the bracket 29 being angularly fixed with respect to the housing 18 and spindle axis 17 by means of a straight pin 31 extending through the lower part of the bracket 29 and into the housing 18. The servomotor mounting plate 32 extends slightly above the top surface of the bracket 29.

The cover 39 is shown in the covered or "closed" position, i.e., with the radially-extending tool clearance opening 42 pointing downwardly. In this position, the drive tang 47 and registration socket 45 of FIG. 4 are shielded from flying chips and the like. The drive tang 47 has an integral driving gear 53, which, when a tool member 51 is absent from the rotation device 30, is spring-biased to enmesh with the same size driven gear 54 which is rotatable about the cover pivot axis 41 (see also FIG. 6). Although a 1:1 gear ratio is depicted, other ratios may be suitable for certain installations. Thus, it can be seen in FIG. 5 that when a boring and facing head 48 is absent from the machine 10, the cover 39 may be driven clockwise through an angle $\Theta$ of approximately 165°, to an open position, in order to expose the drive tang 47 and registration socket 45 for receiving a tool member 51. Following a tool member removal, the cover 39 may be rotated in a counterclockwise direction to close the cover 39 and again shield the drive tang 47 and registration socket 45.

Figure 6:
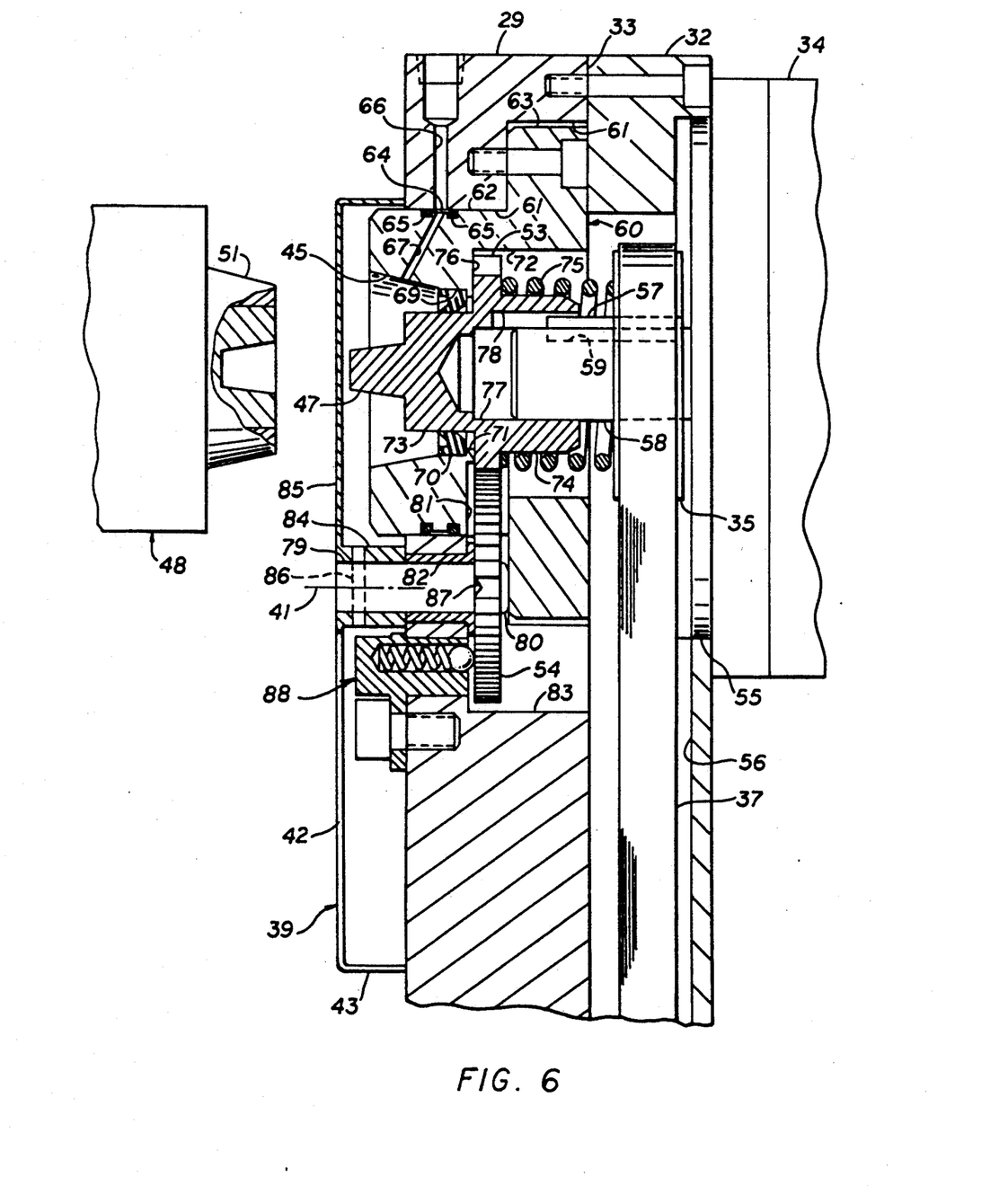
FIG. 6 is a sectional view taken along the line VI—VI of FIG. 5.

Referring now to the details of FIG. 6, the motor mounting plate 32, affixed to the rear face 33 of the bracket 29, supports the servomotor 34. The motor 34 is positioned on the plate 32 by its pilot diameter 55 located in the plate 32. The motor mounting plate 32 has a machined relief 56 to house the switch drive belt 37 which is shown trained around the servomotor shaft pulley 35. The pulley 35 is driven by a straight key 57 extending along the motor shaft 58 within a keyseat 59. A flanged adapter 60 is secured within a counterbore 61 in the rear face 33 of the bracket 29 and extends through a concentric bore 61 in the bracket 29. The pilot diameter 62 of the adapter 60, adjacent its flange 63, has an annular groove 64 formed between two axially spaced O-rings 65 to connect a bracket air supply line 66 to a plurality of radially extending holes 67 within the adapter 60 (only one is depicted) to provide purging air streams to assist in keeping the registration socket 45 and drive tang 47 clean. The stationary conical socket 45 converges inwardly from the front face 68 of the adapter 60, terminating at a seal counterbore 69. The seal counterbore 69 supports a shaft seal 70, shouldered within the adapter 60, adjacent to a clearance bore 71 extending through the adapter 60 to a rear clearance counterbore 72. The drive tang 47 extends frontwardly (i.e., to the left of FIG. 6) and has an adjacent smooth shaft portion 73 which extends through the seal 70 to the integral driving gear 53. The driving gear 53 is immediately followed by a straight hub 74. The hub 74 extends through, and supports thereon, a preloaded helical compression biasing spring 75. The biasing spring 75 reacts against the servomotor pulley 35 and forces the driving gear 53 to a frontward position resting against the bottom 76 of the clearance counterbore 72 of the adapter 60. The drive tang 47 is slideably carried on the servomotor shaft 58 by a precise bore 77 in its hub 74. A keyway 78 within the bore 77 cooperates with the straight key 57 of the motor shaft 58 to accommodate rearward movement of the tang 47 when the biasing spring 75 is overcome, while maintaining a positive torque connection between the drive tang 47 and the motor shaft 58. The driving gear 53 is shown in mesh with the driven gear 54, both of the same proportions, where the driven gear 54 is integral with a pivot shaft 79 rotatable about the cover pivot axis 41. The pivot shaft 79 has a small head 80 after the driven gear 54. The driven gear 54 runs within a radial clearance slot 81 cut through the pilot diameter 62 of the adapter 60. The pivot shaft 79 is journalled for rotation within a flanged bushing 82 received within a gear relief 83 machined in the rear face 33 of the bracket 29, and the driven gear 54 is restrained from endwise movement between the bushing 82, adjacent the gear 54, and the flange 63 of the adapter 60, adjacent the small head 80 of the shaft 79. The pivot shaft 79 extends frontwardly and is received through the central collar 84 of the cover 39. The cover 39 is shown with the tool clearance opening 42 extending downwardly, and has its generally planar disk 85 surrounded by a short cylindrical skirt 43. The skirt 43, disk 85, and collar 84 are welded in unitary assembly, and the collar 84 is fixed to the shaft 79 by a pin 86. Rotation of the servomotor shaft 58 and its driving gear 53 will cause the driven gear 54 and cover 39 to be rotated to the open position shown in FIG. 4.

Figure 7:
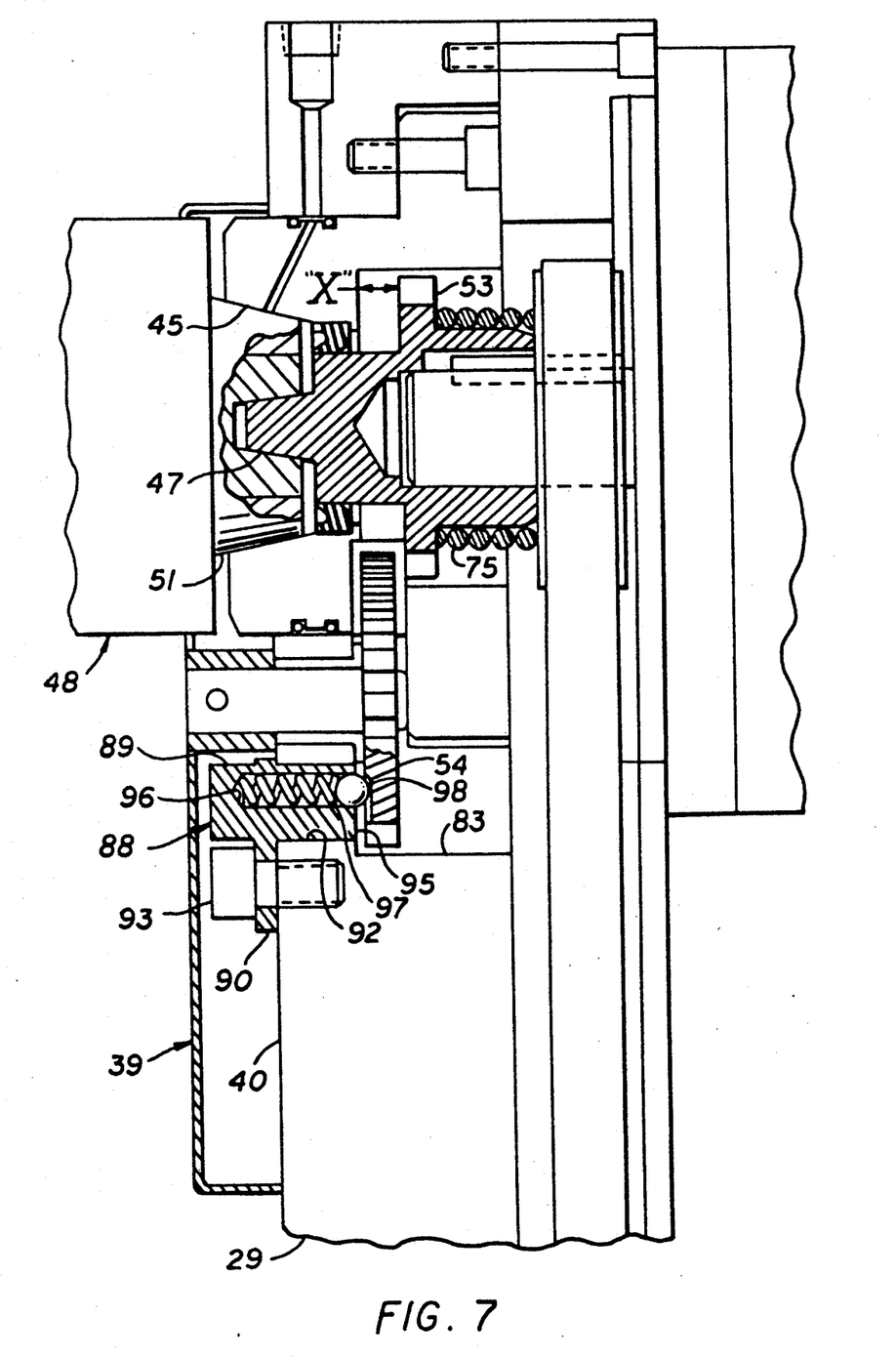
FIG. 7 depicts the elements of FIG. 6, with the cover rotated to the open position, and a tool member present in a tool-receiving socket.
Figure 8:
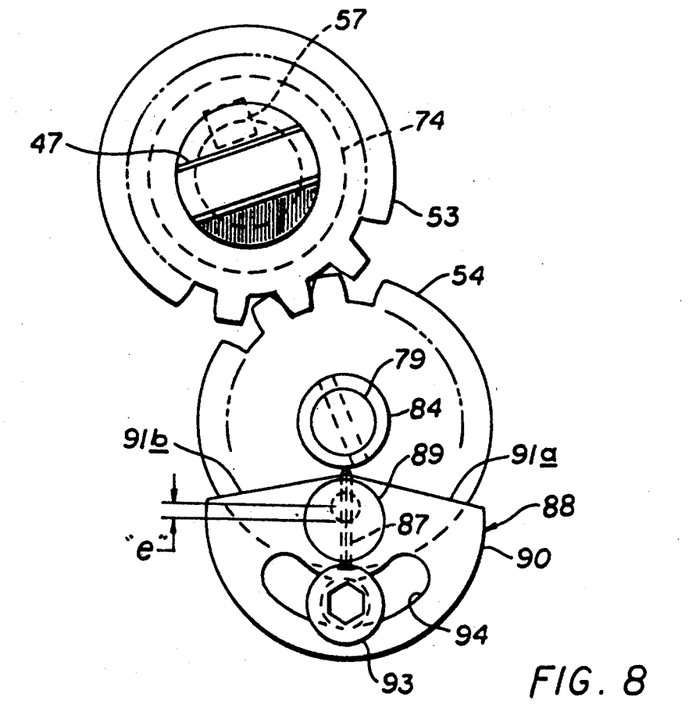
FIG. 8 is an enlarged view showing the relationship of the gears of FIG. 6, when the cover is in the open position.

Refer now to FIG. 7. After the cover 39 is rotated to the open position, and an input tool member 51 of a boring and facing head 48 is received within the registration socket 45 and coupled to the drive tang 47 as shown, the biasing spring 75 is overcome, and the driving gear 53 is axially displaced through a distance "X"; at this time, the gears 53,54 are out of mesh with one another. When the gears 53,54 are not engaged, there may be sufficient friction to prevent the cover 39 and driven gear 54 from rotating, but it is preferred that the driven gear 54 be maintained in a positive, known position so that the servomotor 34 can quickly and easily find the driven gear tooth space with a driving gear tooth for re-enmeshing the gears 53,54. For this purpose, a radially-extending V-shaped notch 87 is provided in the face of the driven gear 54 adjacent the flanged bushing 82 (see FIG. 6 for notch cross-section), and a detent mechanism 88 is utilized. With reference to FIGS. 7 and 8 for details, the detent mechanism 88 comprises a cylindrical plug 89, having a circular flange 90 with chordal flats 91a,b, each sloping away from the collar 84 at approximately 15° to the horizontal, to provide a good range of rotation for the plug 89. The plug 89 is received through a bore 92 in the front face 40 of the bracket 29 and is held to the bracket 29 by a screw 93 extending through an arcuate slot 94 in the flange 90. The inner face 95 of the plug 89 has a drilled hole 96 containing a preloaded compression spring 97; the spring 97 acts to bias a ball 98 against the face of the gear 54. As shown in FIGS. 7 and 8, the ball 98 is received within the gear notch 87 when the cover 39 is in the open position, and remains so, until the driving gear 53 re-enmeshes the driven gear 54 upon removal of the boring and facing head 48 from the machine 10.

As shown exaggerated in FIG. 8, the drilled hole 96 is eccentric to the cylindrical plug 89 by a small radial amount, "e", e.g., 1.5 mm. This radial eccentricity allows the ball 98 to be thrown to the right or left of center a small amount as the plug 89 is rotated, so that the gears 53,54 may be oriented to properly align the tang 47 with respect to the spindle axis 17 of the machine 10.

Figure 9:
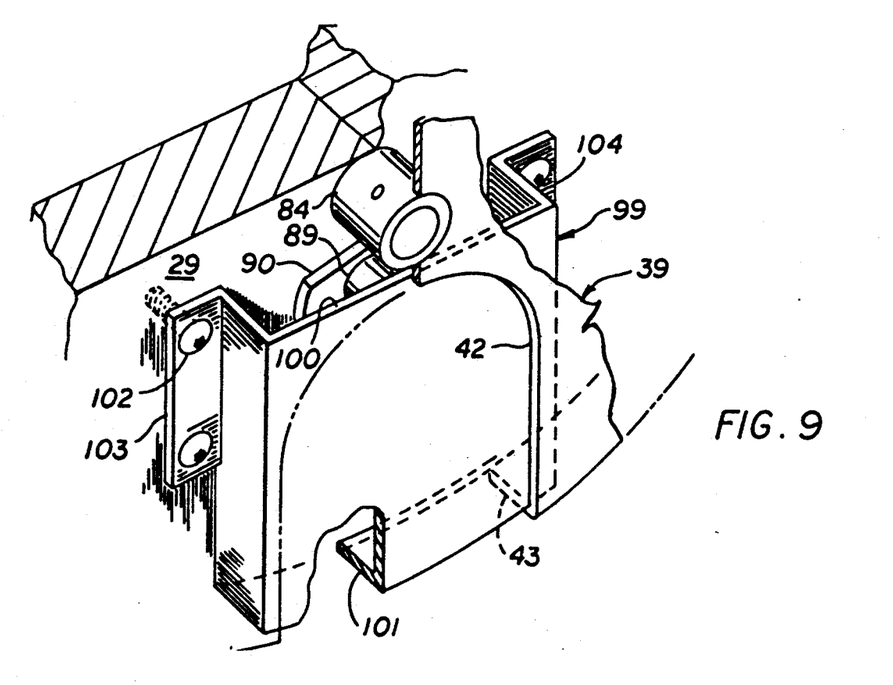
FIG. 9 is a perspective view (similar to FIG. 3) of an alternate embodiment of the invention.

The alternate embodiment of FIG. 9 shows a fixed, box-like inner cover 99 cooperating with the outer cover 39, to substantially fill the clearance opening 42 when the outer cover 39 is in the closed position, and prevent entry of long stringy chips which might otherwise worm their way into the protected socket area. The inner cover 99 fits over the detent plug 89 and flange 90, and may be fabricated of sheet metal. The box-like cover 99 has a flat, open top 100 near the collar 84 of the outer cover 39, and has a closed arcuate bottom 101 closely conforming to the inside diameter of the outer cover skirt 43. Screws 102 passing through side flanges 103,104 secure the inner cover 99 to the bracket 29.

While a disk-like cover 39 has been shown, it will be appreciated that many other shapes may be utilized, and, covers without openings may also be employed so long as they may be moved to cover and uncover the drive tang 47 and registration socket 45, or equivalent components of a similar motorized unit.

Therefore, while the invention has been shown in connection with a preferred embodiment, it is not intended that the invention be so limited. Rather, the invention extends to all such designs and modifications as come within the scope of the appended claims.

What is claimed is:

1. An improved rotation device for driving a detachable tool member of a machine, comprising:
   a bracket, having a first portion, a second portion, and means for attaching said bracket to a machine;
   motor means for driving said tool member, said motor means being affixed to said bracket, proximal said first portion, said motor means having a rotary shaft extending toward said second portion, along a shaft axis;
   connector means on said shaft axis for detachably coupling said rotary shaft to said tool member;
   cover means for selectively covering and uncovering said connector means, said cover means being movably mounted to said bracket; and
   cover drive means for moving said cover means, said cover drive means being drivingly connected to said rotary shaft when said tool member is uncoupled from said connector means, and said cover drive means being disconnected from said rotary shaft when said tool member is coupled to said connector means.

2. The rotation device of claim 1, further comprising:
   pivot means for pivotally mounting said cover means to said bracket.

3. The rotation device of claim 2, further comprising:
   driving gear means affixed to said connector element for moving said pivot means; and
   driven gear means affixed to said pivot means for engaging said driving gear means.

4. The rotation device of claim 3, wherein said cover means comprises:
   a cover affixed to said pivot means, said cover having a substantially planar portion.

5. The rotation device of claim 4, wherein said cover includes a cool clearance opening through said planar portion.

6. An improved rotation device for driving a detachable tool member in a machine, comprising:
   a bracket, having a first portion, a second portion, and a tool clearance surface extending between the first and second portions, said bracket further including means for attaching said bracket to a machine;
   motor means for driving said tool member, said motor means being affixed to said bracket, proximal said first portion, said motor means having a rotary shaft extending toward said second portion, along a shaft axis;
   connector means on said shaft axis for detachably coupling said rotary shaft to said tool member, said connector means including a connector element movable between a first position corresponding to a tool absence condition and a second position corresponding to a tool presence condition;
   cover means for selectively covering and uncovering said connector means, said cover means being movably mounted to said bracket;
   cover drive means for moving said cover means, said cover drive means being drivingly connected to said rotary shaft when said connector element is in said first position, and said cover drive means being disconnected from said rotary shaft when said connector element is in said second position.

7. The rotation device of claim 6, further comprising:
   biasing means for biasing said connector element to said first position, wherein said biasing means is overcome by a tool member received for coupling with said connector element.

8. The rotation device of claim 7, further comprising:
   pivot means for pivotally mounting said cover means to said bracket.

9. The rotation device of claim 8, further comprising:
   driving gear means affixed to said connector element for moving said pivot means; and
   driven gear means affixed to said pivot means for engaging said driving gear means.

10. The rotation device of claim 9, wherein said cover means comprises:
    a cover affixed to said pivot means, said cover having a substantially planar portion.

11. The rotation device of claim 10, wherein said cover means includes
    a tool clearance opening through said planar portion.

12. For use in a machine tool having a spindle rotatable about a spindle axis, the combination comprising:
    a) bracket means affixed to the machine tool;
    b) a rotation device supported by said bracket and laterally spaced from the spindle axis, said rotation device including means for precisely-controlling its rotary movement;
    c) a boring and facing head, including a body adapted to be inserted into the spindle of the machine tool, and retained therewith;

a tool;

first means, coupled to said body and said tool, for supporting said tool for movement transversely of said body with respect to the spindle axis;

second means, coupled to said first means and slidingly engageable with said rotation device for moving said tool transversely of said body in a precision-controlled manner, said second means being laterally-spaced from said body and the spindle axis;

d) cover means for selectively covering said uncovering at least a portion of said rotation device, said cover means being movably mounted to said bracket means; and e) cover drive means for moving said cover means, said cover drive means being drivingly connected to said rotation device when said second means is disengaged from said rotation device and said cover drive means being disconnected from said rotation device when said second means is engaged with said rotation device.

13. The combination of claim 12, further comprising:
pivot means for pivotally mounting said cover means to said bracket means.

14. The combination of claim 13,
wherein said rotation device includes a driving gear means for moving said pivot means, and
wherein said pivot means includes a driven gear means for engaging said driving gear means.

15. The combination of claim 14,
wherein said cover means includes a cover affixed to said pivot means, said cover having a substantially planar portion.

16. The combination of claim 15, wherein said cover includes a tool clearance opening through said planar portion.

* * * * *

UNITED STATES PATENT AND TRADEMARK OFFICE
CERTIFICATE OF CORRECTION

PATENT NO.   : 5,246,414
DATED        : September 21, 1993
INVENTOR(S)  : Raymond L. Hallbach It is certified that error appears in the above-identified patent and that said Letters Patent is hereby corrected as shown below:

Column 8, line 2: "element" should read -- means --.
Column 8, line 11: "cool" should read -- tool --.
Column 9, line 13: "said" should read -- and --.

Signed and Sealed this

Twelfth Day of April, 1994

Attest:

BRUCE LEHMAN

Attesting Officer    Commissioner of Patents and Trademarks